(12) United States Patent
Vinkenvleugel et al.

(10) Patent No.: US 8,730,256 B2
(45) Date of Patent: May 20, 2014

(54) COLOR SELECTION INPUT DEVICE AND METHOD

(75) Inventors: Lucius Theodorus Vinkenvleugel, Eindhoven (NL); Johannes Trudo Cornelis Van Kemenade, Eindhoven (NL); Bram François Joosen, Eindhoven (NL); Paul Philip Thursfield, Eindhoven (NL); Elizabeth Hewitt Zwerver-Curtis, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 642 days.

(21) Appl. No.: 12/439,794

(22) PCT Filed: Sep. 18, 2007

(86) PCT No.: PCT/IB2007/053757
§ 371 (c)(1),
(2), (4) Date: Mar. 3, 2009

(87) PCT Pub. No.: WO2008/038179
PCT Pub. Date: Apr. 3, 2008

(65) Prior Publication Data
US 2010/0053198 A1 Mar. 4, 2010

(30) Foreign Application Priority Data
Sep. 27, 2006 (EP) .................... 06121312

(51) Int. Cl.
*G09G 5/02* (2006.01)
*G06F 3/00* (2006.01)
*G06F 3/048* (2013.01)

(52) U.S. Cl.
USPC ........... 345/590; 345/589; 345/593; 345/594; 715/762; 715/763; 715/810; 715/815; 715/834

(58) Field of Classification Search
USPC .......... 345/593, 594; 715/273, 275, 700, 762, 715/763, 764, 810, 815, 834; 382/162–167
See application file for complete search history.

(56) References Cited

U.S. PATENT DOCUMENTS 5,012,299 A 4/1991 Sawamura et al.
5,416,890 A * 5/1995 Beretta .................. 345/590
(Continued)

FOREIGN PATENT DOCUMENTS

GB 685209 A 12/1952
WO 2005107338 A2 11/2005
(Continued)

OTHER PUBLICATIONS

Beretta, G., Graphhical User Interface for Editing a Palette of Colors, United States Statutory Invention Registration, Reg. No. H1506, Published: Dec. 5, 1995.

*Primary Examiner* — Wesner Sajous
*Assistant Examiner* — Andrew Shin
(74) *Attorney, Agent, or Firm* — Mark L. Beloborodov

(57) ABSTRACT

The invention relates to color selection input, for example by means of a color selection wheel or pad, particularly for a lighting system. The invention provides color selection means (10) representing selectable colors in terms of hue gradation (12) along a direction thereof, wherein the hue gradation is adapted to user preferences in that the hue gradation is divided into non-equal segments (20, 22) with segments of user preferred hue (20) larger than segments of non user preferred hue (22). The invention has the main advantage that the input of a color selection may be better adapted to user preferences.

12 Claims, 3 Drawing Sheets

(56) References Cited

U.S. PATENT DOCUMENTS

| | | | |
|---|---|---|---|
| 6,121,976 A * | 9/2000 | Lu | 345/606 |
| 7,502,033 B1 * | 3/2009 | Axelrod | 345/593 |
| 2002/0089513 A1 | 7/2002 | Blanchard et al. | |

FOREIGN PATENT DOCUMENTS

| | | |
|---|---|---|
| WO | 2006054263 A1 | 5/2006 |
| WO | 2006100650 A2 | 9/2006 |
| WO | 2007085986 A1 | 8/2007 |

* cited by examiner

COLOR SELECTION INPUT DEVICE AND METHOD

This application is a national stage application under 35 U.S.C. §371 of International Application No. PCT/IB2007/053757 filed on Sep. 18, 2007, which claims priority to European Application No. 06121312.0, filed on Sep. 27, 2006, incorporated herein by reference.

The invention relates to color selection input, for example by means of a color selection wheel or pad, particularly for a lighting system.

In order to allow users to create their preferred lighting atmosphere, many modern lighting systems allow adjusting not only the lighting intensity, but also the lighting color. For inputting a color selection into a lighting system, color wheels or pads may be used. U.S. Pat. No. 5,012,299 discloses a color adjustment apparatus for a color picture image reproducing machine including a color chart for visually representing all real colors in terms of color elements of saturation and hue. The color adjustment data may be inputted by means of a touch key. The touch key allows a user to select the preferred hue and saturation by a single touch.

It is an object of the present invention to provide an improved color selection input device and method.

In order to achieve the object defined above, the invention provides a color selection input device comprising color selection means representing selectable colors in terms of hue gradation along a direction thereof, wherein the hue gradation is adapted to user preferences in that the hue gradation is divided into non-equal segments with segments of user preferred hue larger than segments of non user preferred hue.

In order to achieve the object defined above, the invention also provides a color selection input method, comprising
representing selectable colors in terms of hue gradation along a direction,
and
adapting the hue gradation to user preferences by dividing the hue gradation into non-equal segments with segments of user preferred hue larger than segments of non user preferred hue.

The characteristic features according to the invention provide the advantage that the input of a color selection may be better adapted to user preferences, particularly to user preferred colors. Thus, the invention may better address user preferences regarding colors than conventional color input devices and methods with equal segmentations of hue gradation. The color input according to the invention is particularly suitable for modern lighting systems since it allows users to adjust their preferred color settings of illumination at a very fine level. Furthermore, the invention may enable users to more quickly and comfortably adjust the color settings to their preferred colors. The inventive color input may be for example implemented in a kind of remote control for a lighting system, similar to a television remote control. The choice of selectable non user preferred colors may be decreased while the choice of user preferred colors in the non-equal segments is increased.

The term "color selection means" comprises any kind of means suitable for the selection of a certain color or hue, i.e., mechanical as well as electronic selection means or a combination thereof, for example a color wheel or circle, a potentiometer, an electronic control circuitry or a touch pad. The "color selection means" may also be implemented by a computer and a computer program, which is for example adapted to display the color selection means on a display of the computer and to process user input over input devices of the computer, such as from pointing devices or keyboards or touch-sensitive displays. Thus, the term "color selection means" also comprises "virtual" means implemented by software.

The term "along a direction thereof" comprises for example an axis, a circle or a line with the range of colors. The color selection means may also visually represent the selectable colors, for example by displaying the spectrum of selectable colors along a line or a circumferential direction of a color circle.

According to an embodiment of the invention, a segment of user preferred hue may be red-yellow. Since user test have shown that the hue gradation from red to yellow is preferred among user in most cultures and countries, this segment may be selected as one of the user preferred hues.

According to a further embodiment of the invention,
the color selection means may comprise a color circle, and
the red-yellow segment may span an angle between about 70 and about 120 degrees on the color circle.

This embodiment offers a user a large choice in the hue gradation from red to yellow.

According to an embodiment of the invention, the segments of user preferred hue may be red-yellow, yellow-green and green-cyan, and the segments of non user preferred hue may be cyan-blue, blue-magenta and magenta-red.

With this embodiment, a user has a larger choice of colors from the hue gradation of red over green to cyan, while the choice of colors with a hue gradation ranging from cyan over blue and magenta to red is smaller.

According to a further embodiment of the invention,
the color selection means comprise a color circle, and
the red-yellow segment spans an angle of about 80 degrees on the color circle,
the yellow-green segment spans an angle of about 70 degrees on the color circle,
the green-cyan segment spans an angle of about 60 degrees on the color circle, and
each of the cyan-blue segment, the blue-magenta segment and the magenta-red segment spans an angle of about 50 degrees on the color circle.

According to an embodiment of the invention, the segments of user preferred hue may be red-yellow, yellow-green, green-cyan and cyan-blue, and the segments of non user preferred hue may be blue-magenta and magenta-red.

With this embodiment, a user has a larger choice of colors from the hue gradation of red over green and cyan to blue, while the choice of colors with a hue gradation ranging from blue over magenta to red is smaller.

According to a further embodiment of the invention,
the color selection means comprise a color circle, and
the red-yellow segment spans an angle of about 150 degrees on the color circle,
the yellow-green segment spans an angle of about 40 degrees on the color circle,
the green-cyan segment spans an angle of about 40 degrees on the color circle,
the cyan-blue segment spans an angle of about 70 degrees on the color circle, and
each of the blue-magenta segment and the magenta-red segment spans an angle of about 30 degrees on the color circle.

According to an embodiment of the invention,
the color selection means may comprise a color circle, and
the hue gradation may be arranged from yellow to red to magenta to blue to cyan to green in a clockwise direction of the color circle.

According to another embodiment of the invention, the color selection means may comprise a color circle, and the hue gradation may be arranged from yellow to red to magenta to blue to cyan to green in a counter-clockwise direction of the color circle.

According to an embodiment of the invention, the color selection means may further comprise a color circle and visually represent selectable colors in terms of saturation gradation along a radial direction thereof. Thus, a user may not only select a certain color in terms of hue gradation, but also in term of saturation gradation. This enables a user more flexibility in the color selection input of for example a lighting system.

According to a further embodiment of the invention, the input device may comprise
- color selection processing means being adapted to process a hue selection signal from the color selection means indicating the hue selected by a user in that the user preferred hues are determined from received hue selection signals, and
- color representation adoption means being adapted to receive a hues preference signal from the color selection processing means indicating the user preferred hues and to adjust the representation of selectable colors in terms of hue gradation along the circumferential direction of the color selection means in correspondence with the hues preference signal in that the hue gradation is divided into non-equal segments with segments of user preferred hue larger than segments of non user preferred hue.

This allows to dynamically adapting the color choice to user input. For example, if a user often selects colors from the hue gradation ranging from red to yellow, the color selection processing means may note this and signal to the color representation adoption means to initiate a corresponding adjustment of the visual representation of selectable colors. This embodiment may further comprise an easily changeable visual representation of selectable colors such as color display means, for example a LCD (Liquid Crystal Display).

According to an embodiment of the invention, the resolution of input in segments of user preferred hue may be higher than the resolution of input in segments of non user preferred hue. The term "resolution of input" means for example the gradation of possible inputs in a certain segment. The gradation may be usually determined by the input means, particularly by the possible input area of the input means. For example, an analog potentiometer may offer a very high resolution while digital input means may only provide a relatively small resolution. In this embodiment, the resolution is increased in segements with user preferred hue in order to allow a user finer selection.

According to a further embodiment of the invention, a computer program is provided, wherein the computer program may be enabled to carry out the method according to the invention when executed by a computer. The computer program allows to implement the invention for example in a Personal Computer (PC) which may be used for controlling a complex lighting system.

According to an embodiment of the invention, a record carrier such as a CD-ROM, DVD, memory card, floppy disk or similar storage medium may be provided for storing a computer program according to the invention.

These and other aspects of the invention will be apparent from and elucidated with reference to the embodiment(s) described hereinafter.

The invention will be described in more detail hereinafter with reference to exemplary embodiments. However, the invention is not limited to these exemplary embodiments.

Figure 1:
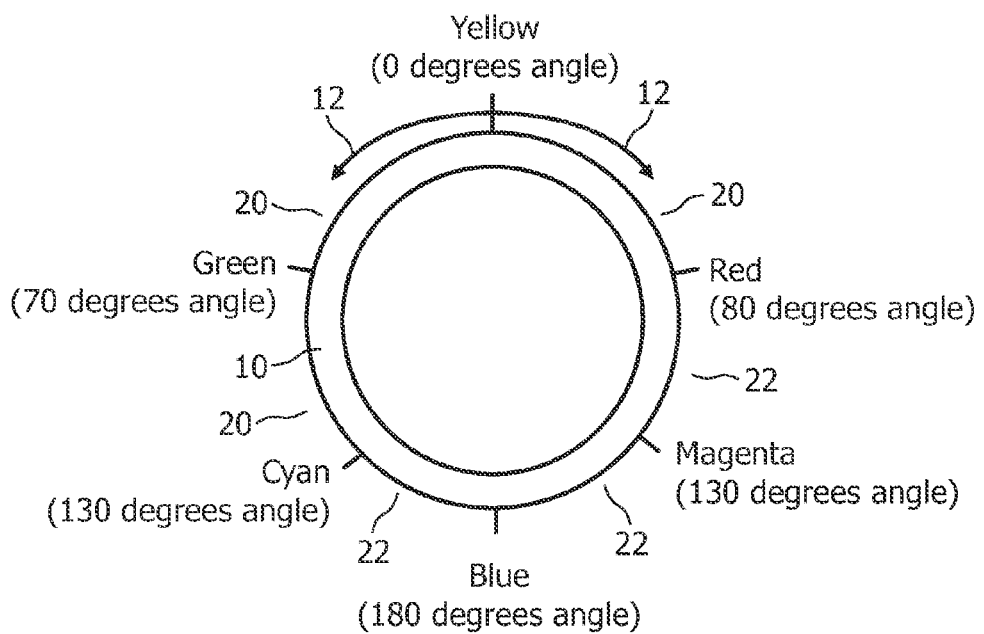
FIG. 1 shows a first embodiment of a color wheel of a color selection input device according to the invention.

In the following description, the invention is described by means of a color wheel or circle which is an often used device to input a color selection into a modern lighting system. However, it should be noted that the invention is not limited to color wheels or circles and to lighting systems and may be also implemented by other input devices such as a color sliding control, or a touch pad or computer program visually representing the "color space", i.e. the available colors in a two dimensional representation, and used for color selection for example for a TV set or a Computer display. Furthermore, (functional) similar or identical elements in the drawings may be denoted with the same reference numerals in the following description.

Modern lighting systems allow not only controlling the lighting intensity, but also the lighting color in order to create a pleasant atmosphere. In order to navigate and set colors of a light source, a so-called color circle or color wheel, respectively, may be used. The color circle represents selectable colors in terms of hue gradation along a circumferential direction thereof. Also, the selectable colors may be visually displayed on the color circle instead of for example with a textual representation. The color circle thus forms a kind of comfortable color selection area for a user. A user can select a certain color by either mechanically rotating the color circle, or by touching the preferred hue on the color circle when the color circle or wheel is implemented by a touch sensitive color input device. The selected hue may be transmitted from a color selection input device comprising the color circle to a lighting system, which then sets the desired color by controlling the light sources of the lighting system. The color circle may be implemented for example in a light switch, a lighting system control board, a lighting system control PC or in a remote control of a lighting system.

Figure 4:
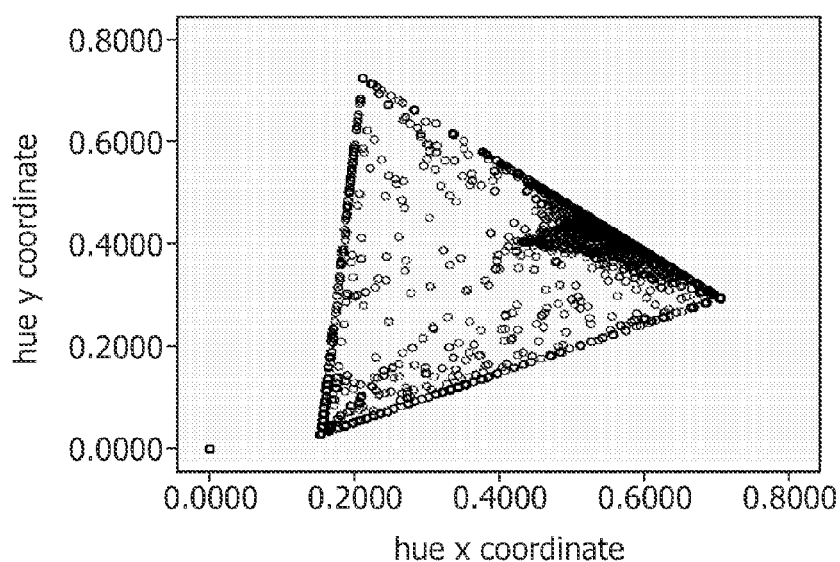
FIG. 4 shows a diagram with most preferred hues by users according to a user test.

In home placement consumer tests, data has been logged of color settings people prefer in their homes, as shown in the diagram of FIG. 4. The data of the diagram of FIG. 4 show that consumers most of the time prefer to set their own choice of particular colors as part of the full spectrum of available colors. Each user often has particular preferences, but in average, consumers like some colors more as others colors. This preference can differ because of cultural differences and between people from different countries. Each circle in FIG. 4 represents a user-set color choice. The above tests have shown that most users usually do not make full use of the entire spectrum of colors in a color circle, but only of a small fraction of the color spectrum which comprises the user preferred colors. For example, if a user prefers blue hues and red hues, she or he does very rarely select green or yellow hues. Therefore, a better adoption of the hue gradation on a color circle or wheel is desirable for better matching user preferences and increasing user convenience.

The invention offers user's customized options that better suit the choice in the area of users' preferences. The color choice is done via a user interface like a color selection input device, for example the above mentioned color circle that may direct the users' choice to a light source. The invention increases the color selection area in the color selection area where the preferred user colors are located and decreases the area of less preferred colors.

FIG. 1 shows a color circle 10 representing on its circumferential direction the selectable colors in terms of hue gradation 12. At the top point of the color circle 10, the hue yellow is located in FIG. 1. In clockwise direction, the hue ranges from yellow to red at an angle of about 80 degrees, to magenta at an angle of about 130 degrees, to blue at an angle of about 180 degrees. In counter-clockwise direction, the hue ranges from yellow to green at an angle of about 70 degrees, to cyan at an angle of about 130 degrees. According to this segmentation of the hue gradation on the color circle 10, larger segments 20 and smaller segments 22 of hue are obtained. The segmentation is shown by the small black lines arranged around the circumferential direction of the color circle 10. These small black lines are only for the purpose of demonstration and are usually not part of the color circle in practice, though they could be helpful for a user to quickly recognize the segmentation (for example these lines may be printed directly on the color circle in order to indicate primary colors).

In FIG. 1 the segment sizes of the color circle 10 are:
red-yellow: size about 80 degrees angle (i.e., red-yellow spans an angle of about 80 degrees)
yellow-green: size about 70 degrees angle
green-cyan: size about 60 degrees angle
cyan-blue: size about 50 degrees angle
blue-magenta: size about 50 degrees angle
magenta-red: size about 50 degrees angle Due to the larger segments 20, the hue gradation in these segments may be increased and, therefore, finer than in the smaller segments 22, thus offering a user more selectable colors in the larger segments 20.

Figure 2:
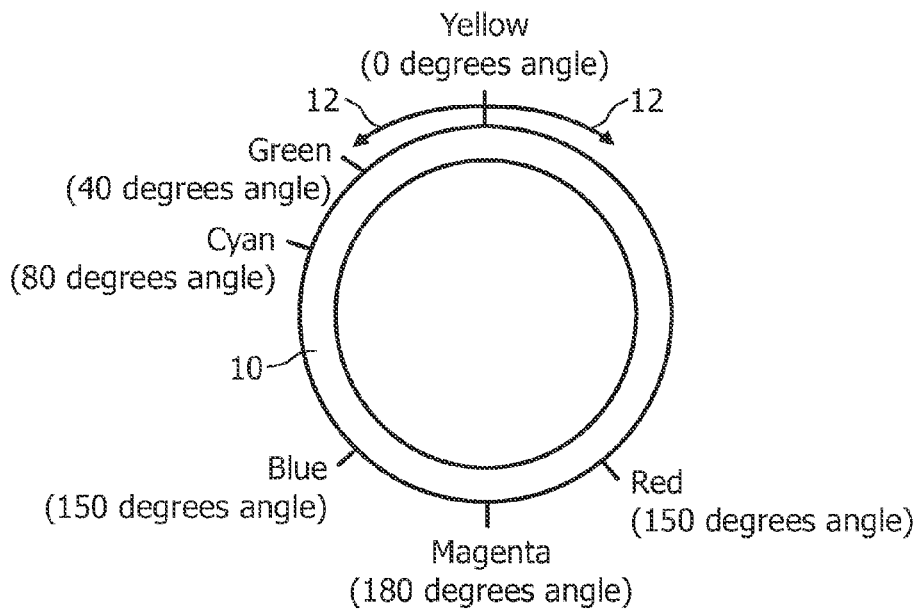
FIG. 2 shows a second embodiment of a color wheel of a color selection input device according to the invention.

Another example with larger differences in the sizes of the segments is shown in FIG. 2. In FIG. 2 the segment sizes of the color circle 10 are:
red-yellow: size about 150 degrees angle
yellow-green: size about 40 degrees angle
green-cyan: size about 40 degrees angle
cyan-blue: size about 70 degrees angle
blue-magenta: size about 30 degrees angle
magenta-red: size about 30 degrees angle With this embodiment, a user has most choices of selectable colors in the red-yellow segment and still a large choice in the cyan-blue segment. The smallest choice of selectable colors is in the blue-magenta and magenta-red segments which contain non or less user preferred colors.

The above embodiments describe color wheels with given sizes of each segment. The invention is however not limited to these sizes. The size of a segment can vary between about 10 and about 270 degree. For some applications, a segment can even be omitted.

In this way, the invention gives the user more color choice in the area of his/her preferences and the user is better able to fine-tune the color choice in the area of the larger sections. With the color wheel shown in FIG. 2 for example, the user has much more choice and fine-tune possibilities in the area of the yellow-orange-red colors.

The color wheel can also be rotated such that yellow is not on top but another color. In this way, the most preferred colors can be placed in the best ergonomic location for the user when using the color wheel on the interface device.

Another (obvious) variation is to mirror the color wheel such that yellow-to-red transformation is directed counter-clock-wise instead of clock-wise.

Figure 3:
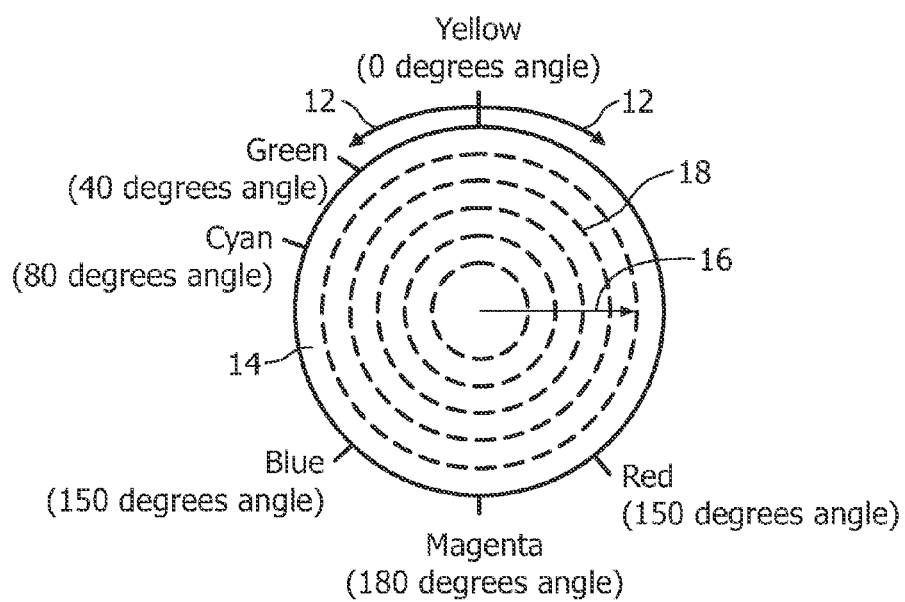
FIG. 3 shows a third embodiment of a color wheel of a color selection input device according to the invention enabling a user also to input the saturation.

A further variation on this concept is to use a color pad with saturated colors at the edge of the circle and white color in the centre, as shown in FIG. 3. In this embodiment, a user may not only select a certain hue, but also the saturation by for example touching a certain point on the color circle. The dotted lines 18 on the circle 14 represent different gradations of saturation with an increasing graduation of saturation 16 from the center of the circle to the boundary.

Figure 5:
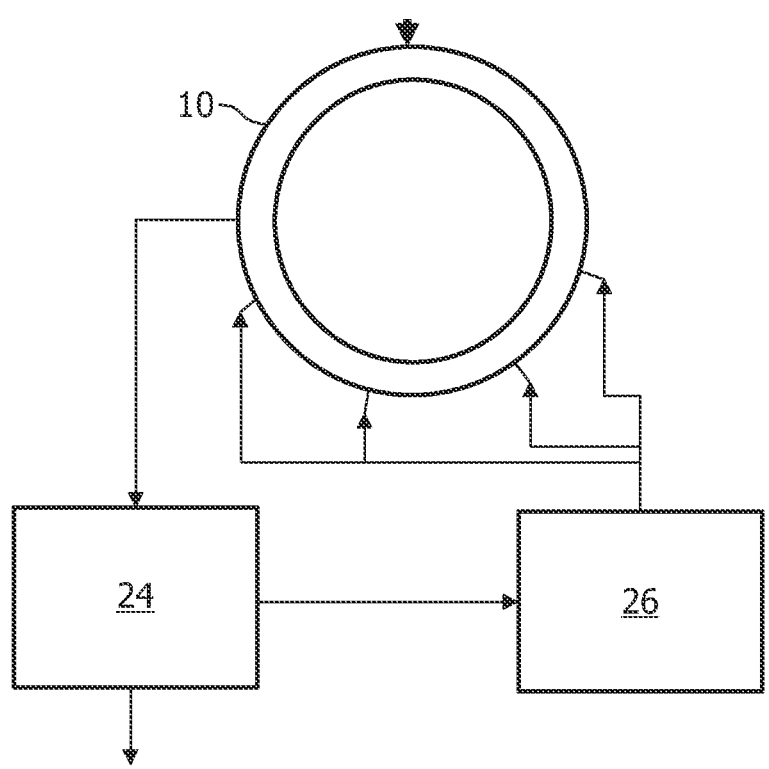
FIG. 5 shows an embodiment of a color selection input device with a dynamic adoption of the visual representation of selectable colors according to the invention.

A color wheel or pad implementing the invention may not be static like printed on a foil or surface, but can be changed dynamically like on a graphic device or LCD screen. An embodiment of this implementation is shown in FIG. 5. The input of a color wheel 10, for example the position of the color wheel 10 is input to color selection processing means 24. The means 24 process a hue selection signal from the color wheel 10 indicating the hue selected by a user. The hue selection signal is processed in that the user preferred hues are determined from received hue selection signals. Typically, means 24 track the hue selection signals for a certain time and then process the tracked signals in order to determine colors preferred by the user. The preferred colors are then transmitted as a hues preference signal to color representation adoption means 26. Means 26 adjust the visual representation of selectable colors in terms of hue gradation 12 along a direction of the color wheel 10 in correspondence with the hues preference signal in that the hue gradation is divided into non-equal segments 20, 22 with segments of user preferred hue 20 larger than segments of non user preferred hue 22.

The color selection processing means 24 and the color representation adoption means 26 may be implemented by software, for example by a kind of learning software that detects the users' preferences and adjusts the size of the segments accordingly. A typical implementation would be a PC with a program adapted to display the color wheel 10 on its display. A user could then select a preferred color by clicking on the corresponding position on the color wheel 10 or by touching on the color wheel 10 in case of a touch-sensitive display. The user input could then be processed by a computer program implementing the color selection processing means 24 and the color representation adoption means 26. The color wheel 10 could then be dynamically adapted by this program to the user input, i.e., the user preferred color selections.

Another option would be that the user can adjust the size of the segments manually.

The invention is particularly suitable for application in the field of color adjustment of a complex lighting system.

The invention has the main advantage that makes it more comfortable for a user to select a preferred color or hue, respectively. Furthermore, the invention makes it possible to adopt the color selection to user preferences.

At least some of the functionality of the invention such as the functionality of the color selection processing means may be performed by hard- or software. In case of an implementation in software, a single or multiple standard microprocessors or microcontrollers may be used to process a single or multiple algorithms implementing the invention.

It should be noted that the word "comprise" does not exclude other elements or steps, and that the word "a" or "an" does not exclude a plurality. Furthermore, any reference signs in the claims shall not be construed as limiting the scope of the invention.

The invention claimed is:
1. A color selection input device, comprising:
a non-static and dynamically adjustable color circle and a color selector representing user-selectable colors arranged on said adjustable color circle according to hue gradation along a direction thereof, wherein the representation of user-selectable colors on said adjustable color circle is non-symmetrically divided into a plurality of non-equal segments including first segments of a user-preferred hue and second segments of non-user-preferred hue;

said user-preferred hue and said non-user preferred hue determined according to user preference input, said user-preferred input determined from received hue selection signals of said color selector tracked over a time period;

said adjustable color circle modified based upon said user-preferred input to modify on a regular basis said first segments relative to said second segments, wherein each first segment is larger than each second segment, one of the first segments is a segment including the hues of red to yellow, one of the second segments includes a segment including the hues of blue to magenta, wherein a resolution of input in the first segments is higher than a resolution of input in the second segments, and wherein said color selection input device is configured to transmit a color of said user-selectable colors to a lighting system in response to a user selection of the color on said adjustable color circle.

2. The input device of claim 1, wherein the segment including the hues of red to yellow spans an angle between about 70 and about 120 degrees on the color circle.

3. The input device of claim 1, wherein the first segments are red-yellow, yellow-green and green-cyan, and the second segments are cyan-blue, blue-magenta and magenta-red.

4. The input device of claim 3, wherein the red-yellow segment spans an angle of about 80 degrees on the color circle, the yellow-green segment spans an angle of about 70 degrees on the color circle, the green-cyan segment spans an angle of about 60 degrees on the color circle, and each of the cyan-blue segment, the blue-magenta segment and the magenta-red segment spans an angle of about 50 degrees on the color circle.

5. The input device of claim 1, wherein the first segments are red-yellow, yellow-green, green-cyan and cyan-blue, and the second segments are blue-magenta and magenta-red.

6. The input device of claim 5, wherein the red-yellow segment spans an angle of about 150 degrees on the color circle, the yellow-green segment spans an angle of about 40 degrees on the color circle, the green-cyan segment spans an angle of about 40 degrees on the color circle, the cyan-blue segment spans an angle of about 70 degrees on the color circle, and each of the blue-magenta segment and the magenta-red segment spans an angle of about 30 degrees on the color circle.

7. The input device of claim 1, wherein the hue gradation is arranged from yellow to red to magenta to blue to cyan to green in a clockwise direction of the color circle.

8. The input device of claim 1, wherein the hue gradation is arranged from yellow to red to magenta to blue to cyan to green in a counter-clockwise direction of the color circle.

9. The input device of claim 1, wherein the color circle visually represents selectable colors in terms of saturation gradation along a radial direction thereof.

10. The input device of claim 1, further comprising:

said color selector configured to process a hue selection signal from the color selector indicating the hue selected by a user, wherein the user preferred hues are determined from said received hue selection signals, and color representation adopter configured to receive said hues preference signal from the color selector indicating the user preferred hues and to adjust the representation of said color circle selectable colors arranged according to hue gradation along a direction of the color selector in correspondence with the hues preference signal, wherein the hue gradation is divided into a plurality of non-equal segments comprising first segments of user-preferred hue and second segments of non-user-preferred hue, each first segment being larger than each second segment.

11. A color selection input method, comprising:

representing user-selectable colors in terms of hue gradation along a direction on a color circle substantially surrounding a color selector, adapting the hue gradation to user inputted preferences tracked over a period of time by dividing the hue gradation into a plurality of non-equal segments comprising first segments of user-preferred hue and second segments of non-user-preferred hue, wherein each first segments being larger than each second segment, one of the first segments is the segment with the hues of red to yellow and one of the second segments is the segment with the hues of blue to magenta, dynamically increasing a resolution of the tracked user input preferences on said color circle in said first segment so that said resolution of input in said first segment is higher than a resolution of input on said second segment;

identifying a user selection from the color circle of a color of the user-selectable colors; and providing the color as a color selection input for a lighting system.

12. A color selection input device, comprising:

an adjustable color display circle substantially surrounding a color selector, said color display circle representing user-selectable colors arranged on said adjustable color circle according to hue gradation;

wherein said user-selectable colors on said adjustable color display circle is divided into a plurality of non-equal segments including at least a first segment of a user-preferred hue and a second segment of non-user-preferred hue;

said plurality of non-equal segments being non-equally partitioned to display a resolution of user-preferred hues in a higher resolution on said color display circle first segment as compared to a resolution of non-user preferred hues on said second segment;

said user-preferred hue and said non-user preferred hue determined according to user preference input through said color selector tracked over time;

said user-preferred input determined from received hue selection signals of said color selector;

said adjustable color display circle output dynamically modified on a regular basis based upon said user-preferred input to adjust said first segment relative to said second segment;

said first segment being displayed larger than said second segment; and wherein said color selection input device is configured to transmit a color of said user-selectable colors to a lighting system in response to a user selection of the color on said adjustable color circle.

* * * * *